US011216105B2

(12) United States Patent
Wang (10) Patent No.: US 11,216,105 B2
(45) Date of Patent: Jan. 4, 2022

(54) FLEXIBLE DISPLAY DEVICE, INTELLIGENT PROTECTING METHOD THEREOF, AND COMPUTER READABLE STORAGE MEDIUM

(71) Applicant: Wuhan China Star Optoelectronics Semiconductor Display Technology Co., Ltd., Hubei (CN)

(72) Inventor: Fang Wang, Hubei (CN)

(73) Assignee: Wuhan China Star Optoelectronics Semiconductor Display Technology Co., Ltd., Hubei (CN)

(*) Notice: Subject to any disclaimer, the term of this patent is extended or adjusted under 35 U.S.C. 154(b) by 271 days.

(21) Appl. No.: 16/624,798

(22) PCT Filed: Sep. 6, 2019

(86) PCT No.: PCT/CN2019/104669
§ 371 (c)(1),
(2) Date: Dec. 19, 2019

(87) PCT Pub. No.: WO2021/026982
PCT Pub. Date: Feb. 18, 2021

(65) Prior Publication Data
US 2021/0333920 A1 Oct. 28, 2021

(30) Foreign Application Priority Data
Aug. 14, 2019 (CN) .......................... 201910748887.5

(51) Int. Cl.
*G06F 3/041* (2006.01)
*G01V 7/06* (2006.01)
(Continued)

(52) U.S. Cl.
CPC .............. *G06F 3/0416* (2013.01); *G01V 7/06* (2013.01); *G01P 15/18* (2013.01); *G06F 1/1652* (2013.01);
(Continued)

(58) Field of Classification Search
CPC .. G06F 3/0416; G06F 3/04842; G06F 1/1652; G06F 1/1626; G06F 1/1656;
(Continued)

(56) References Cited

U.S. PATENT DOCUMENTS

2013/0257582 A1* 10/2013 Rothkopf .............. G06F 1/1656
340/3.1
2015/0149408 A1* 5/2015 Lin ...................... G06F 11/1456
707/610
(Continued)

FOREIGN PATENT DOCUMENTS

| CN | 103679056 A | * | 3/2014 |
| CN | 107132909 A | | 9/2017 |

*Primary Examiner* — Ryan A Lubit
(74) *Attorney, Agent, or Firm* — Geoffrey Lottenberg; Berger Singerman LLP (57) ABSTRACT

The present invention discloses a flexible display device and an intelligent protecting method thereof and a computer readable storage medium. The present invention, when detecting that the flexible display device is in an intelligent protective mode, obtains gravity detection data, and determines whether the flexible display device fulfills an intelligent protective condition. When the intelligent protective condition is fulfilled, a first structural member and a second structural member of the flexible display device are controlled to pivot at a predetermined angular velocity relative to a pivot shaft such that an included angle between flexible display screen lamination structures is less than 180 degrees.

20 Claims, 8 Drawing Sheets

(51) Int. Cl.
*G01P 15/18* (2013.01)
*G06F 3/0484* (2013.01)
*G06F 1/16* (2006.01)

(52) U.S. Cl.
CPC ............... *G06F 3/04842* (2013.01); *G06F 2203/04102* (2013.01); *G06F 2203/04107* (2013.01)

(58) Field of Classification Search
CPC ............ G06F 11/1456; G06F 11/1461; G06F 17/30174; G06F 2203/04102; G06F 2203/04107; G06F 2200/1633; G06F 2200/1634
See application file for complete search history.

(56) References Cited

U.S. PATENT DOCUMENTS

2019/0166235 A1\* 5/2019 Zeng ..................... H04M 1/026
2021/0311523 A1\* 10/2021 Bai ....................... G06F 1/1626

\* cited by examiner

FLEXIBLE DISPLAY DEVICE, INTELLIGENT PROTECTING METHOD THEREOF, AND COMPUTER READABLE STORAGE MEDIUM

CROSS-REFERENCE TO RELATED APPLICATIONS

This application is the National phase under 35 U.S.C. § 371 of International Application No. PCT/CN2019/104669, filed Sep. 6, 2019, which claims the benefit of and priority to Chinese Patent Application No. 201910748887.5, filed Aug. 14, 2019. The entire contents of these patent applications are hereby incorporated by reference herein.

FIELD OF INVENTION

The present invention relates to a field of electrical technologies, especially to a flexible display device, an intelligent protecting method thereof, and a computer readable storage medium.

BACKGROUND OF INVENTION

Flexible display devices have attracted attention because of their flexible display screen, but also have a disadvantage of being vulnerable because of the flexible display screen.

SUMMARY OF INVENTION

Technical Issue

A conventional flexible display device is easily broken.

Technical Solution

The present invention provides a flexible display device, comprising a first structural member, a second structural member, a processor, a storage device, a communication bus, and a pivot shaft connecting the first structural member with the second structural member;

wherein each of the first structural member and the second structural member on the flexible display device comprises a flexible display screen lamination structure, and the flexible display screen lamination structure comprises a covering window layer, a polarizer layer, a touch panel layer, a substrate layer, a sensitive and back-protective layer, a buffer material layer, and a back support;

wherein the sensitive and back-protective layer comprises a gravity sensor and a back protective material, and the gravity sensor is disposed on the back protective material;

wherein the communication bus is configured to achieve connective communication between the processor and the storage device;

wherein the processor is configured to perform one or a plurality of programs stored in the storage device to implement:

detecting whether the flexible display device is in an intelligent protective mode;

if yes, acquiring gravity detection data detected by the gravity sensor, and determining whether the flexible display device fulfills an intelligent protective condition based on the gravity detection data;

when the flexible display device fulfills the intelligent protective condition, controlling the first structural member and the second structural member of the flexible display device to pivot at a predetermined angular velocity relative to the pivot shaft such that an included angle between the flexible display screen lamination structure of the first structural member and the flexible display screen lamination structure of the second structural member is less than 180 degrees.

The present invention also provides a flexible display device, comprising a first structural member, a second structural member, a processor, a storage device, a communication bus, and a pivot shaft connecting the first structural member with the second structural member;

wherein each of the first structural member and the second structural member on the flexible display device comprises a flexible display screen lamination structure, and the flexible display screen lamination structure comprises a covering window layer, a polarizer layer, a touch panel layer, a substrate layer, a back-protective layer, a buffer material layer, and a back support;

wherein gravity sensors are disposed on edges of the substrate layer respectively;

wherein the communication bus is configured to achieve connective communication between the processor and the storage device;

wherein the processor is configured to perform one or a plurality of programs stored in the storage device to implement:

detecting whether the flexible display device is in an intelligent protective mode;

if yes, acquiring gravity detection data detected by the gravity sensor, and determining whether the flexible display device fulfills an intelligent protective condition based on the gravity detection data;

when the flexible display device fulfills the intelligent protective condition, controlling the first structural member and the second structural member of the flexible display device to pivot at a predetermined angular velocity relative to the pivot shaft such that an included angle between the flexible display screen lamination structure of the first structural member and the flexible display screen lamination structure of the second structural member is less than 180 degrees.

The present invention also provides an intelligent protecting method for a flexible display device, the flexible display device comprises a first structural member, a second structural member, and a pivot shaft connecting the first structural member with the second structural member, a surface of the first structural member, second structural member comprises a flexible display screen lamination structure, the flexible display device comprises a gravity sensor therein, and the intelligent protecting method comprises:

detecting whether the flexible display device is in an intelligent protective mode;

if yes, acquiring gravity detection data detected by the gravity sensor, and determining whether the flexible display device fulfills an intelligent protective condition based on the gravity detection data;

when the flexible display device fulfills the intelligent protective condition, controlling the first structural member and the second structural member of the flexible display device to pivot at a predetermined angular velocity relative to the pivot shaft such that an included angle between the flexible display screen lamination structure of the first structural member and the flexible display screen lamination structure of the second structural member is less than 180 degrees.

The present invention further comprises a computer readable storage medium, computer readable storage medium is storage with one or a plurality of programs, one or a plurality of programs that are able to be implemented by one or a plurality of processor to perform the steps of the above intelligent protecting method for a flexible display device.

Advantages

The present invention, when detecting that the flexible display device is in the intelligent protective mode and fulfills the intelligent protective condition, can control the first structural member and the second structural member to pivot at the predetermined angular velocity relative the pivot shaft such that the included angle between the flexible display screen lamination structure of the first structural member and the flexible display screen lamination structure of the second structural member is less than 180 degrees. In other words, the flexible display screen lamination structure of the flexible display device is located between the first structural member and the second structural member, and when the flexible display device falls and impacts the ground, the flexible display device is prevented from being damaged by an external impact.

DETAILED DESCRIPTION OF PREFERRED EMBODIMENTS

To make inventive objectives, characteristics, and advantages of the present invention can be more apparent and understood better, the technical solution in the embodiment of the present invention will be clearly and completely described below with reference to the accompanying drawings in the embodiments of the present invention. Apparently, the described embodiments are merely some embodiments of the present invention instead of all embodiments. According to the embodiments in the present invention, all other embodiments obtained by those skilled in the art without making any creative effort shall fall within the protection scope of the present invention.

Figure 1:
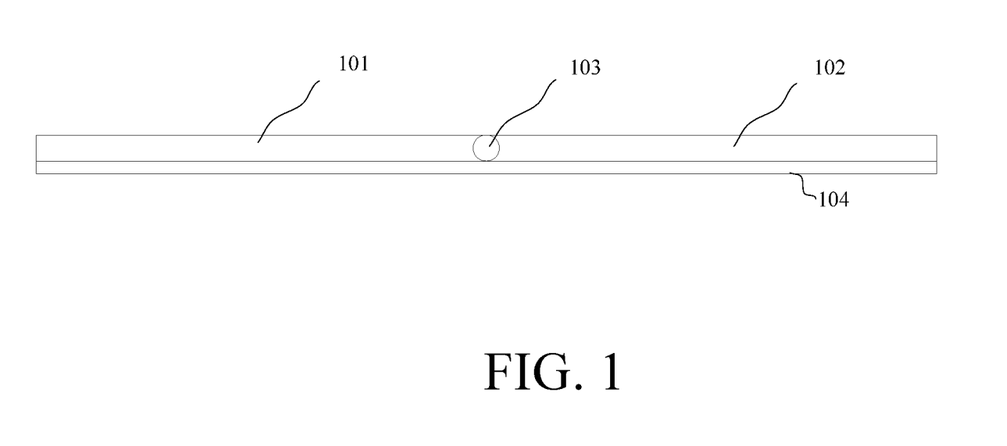
FIG. 1 is a hardware schematic structural view of a flexible display device provided by an embodiment of the present invention.

The present invention provides a flexible display device. With reference to FIG. 1, the flexible display device comprises a first structural member 101, a second structural member 102, and a pivot shaft 103 connecting the first structural member with the second structural member. A flexible display screen lamination structure 104 is disposed on a surface of each of the first structural member 102 and a surface of the second structural member 103.

It should be understood that the pivot shaft in the flexible display device can be a physical pivot shaft in a hinge form, and can be a "pivot shaft" of flexible display device itself without a physical pivot shaft.

Figure 2:
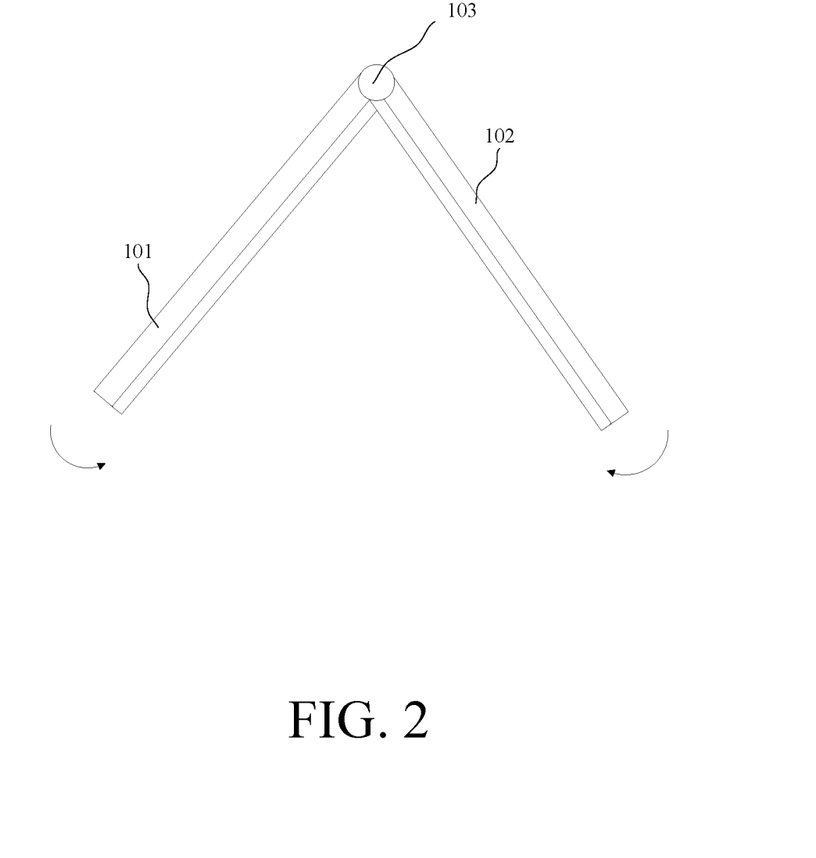
FIG. 2 is a hardware schematic structural view of the flexible display device provided by an embodiment of the present invention in a folding status.
Figure 3:
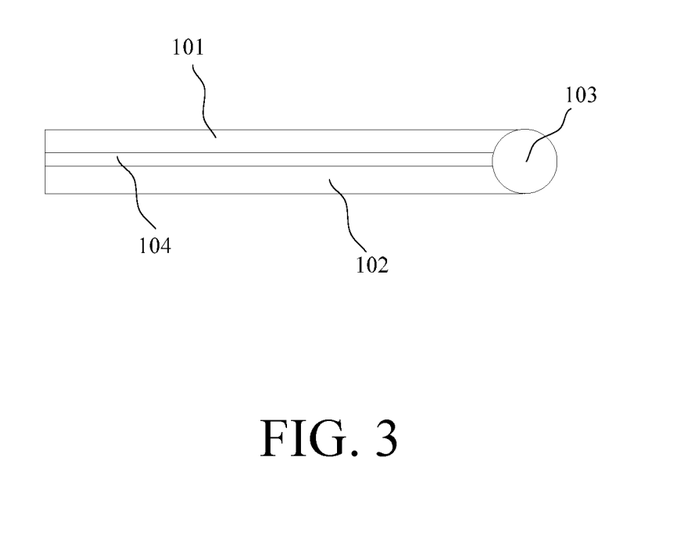
FIG. 3 is a hardware schematic structural view of the flexible display device provided by an embodiment of the present invention in a complete folding status.

With reference to FIGS. 2 and 3, the first structural member 101 and the second structural member 102 can pivot relative to the pivot shaft 103 such that the flexible display screen lamination structures 104 on the first structural member 101 and the second structural member 102 contact each other. In other words, closing the flexible display device with the flexible display screen lamination structures 104 enclosed between the first structural member and the second structural member can prevent the flexible display device from being damaged by an external impact when the flexible display device falls off to the ground.

Figure 4:
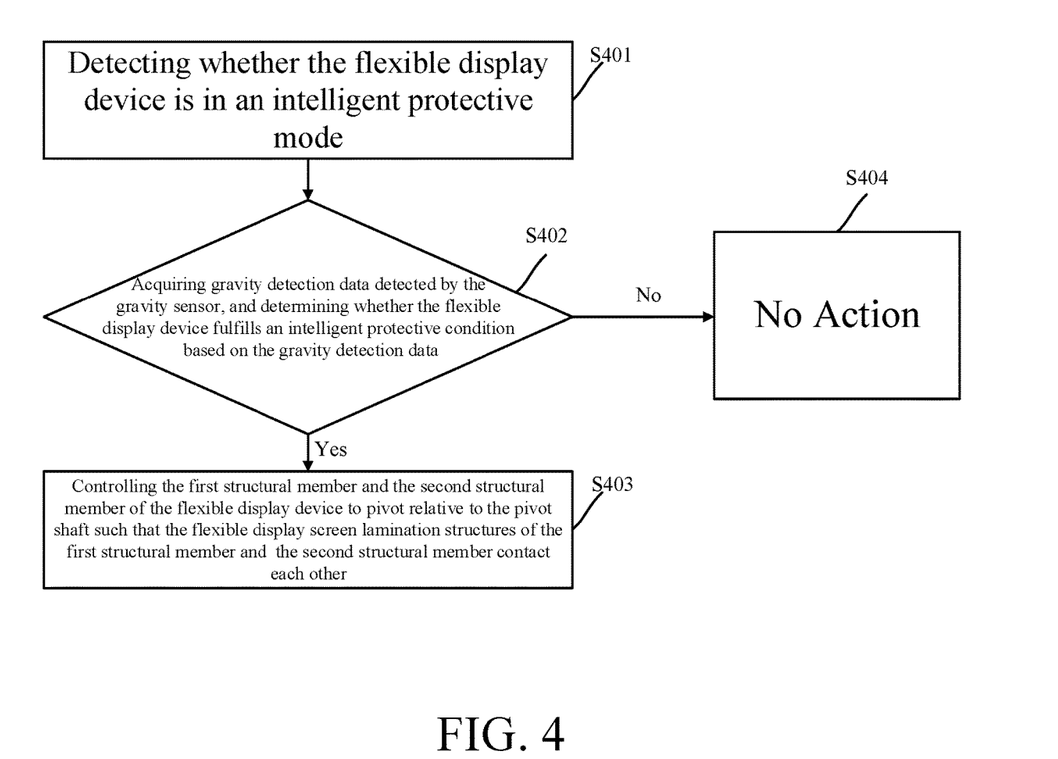
FIG. 4 is a schematic basic flowchart of an intelligent protecting method for a flexible display device provided by an embodiment of the present invention.

The flexible display device further comprises a gravity sensor. With reference to FIG. 4, an intelligent protecting method for a flexible display device provided by the present invention comprises steps as follows.

A step S401 comprises detecting whether the flexible display device is in an intelligent protective mode.

A step S402 comprises if yes, acquiring gravity detection data detected by the gravity sensor, and determining whether the flexible display device fulfills an intelligent protective condition based on the gravity detection data.

The flexible display device provided by the present invention is disposed with the intelligent protective mode. When the intelligent protective mode is opened and the flexible display device fulfills a certain condition (determining whether the flexible display device fulfills the intelligent protective condition based on the gravity detection data), the first structural member 101 and the second structural member 102 in the flexible display device can automatically pivot relative to the pivot shaft 103.

It should be understood that the gravity detection data detected by the gravity sensor has data of three directions, in other words, the gravity detection data comprises X-axis detection data, Y-axis detection data, and Z-axis detection data. A determination of whether flexible display device fulfills the intelligent protective condition based on the X-axis detection data, the Y-axis detection data, and the Z-axis detection data can be performed later.

The gravity sensor can detect an acceleration due to the gravity to further calculate a tilt angle of a device relative to a level, and can figure out movement of the flexible display device by analyzing a acceleration.

In other examples, flexible display device further comprises an accelerometer, and the step S402 further comprises: acquiring acceleration detection data detected by the accelerometer, determining that the flexible display device fails to fulfill the intelligent protective condition when it is determined that the acceleration detection data fails to fulfill a range of a predetermined acceleration detection data.

A step S403 comprises when the flexible display device fulfills the intelligent protective condition, controlling the first structural member and the second structural member of the flexible display device to pivot at a predetermined angular velocity relative to the pivot shaft such that an included angle between the flexible display screen lamination structure of the first structural member and the flexible display screen lamination structure of the second structural member is less than 180 degrees.

It should be understood that after the step S403, a step is further included as follows: detecting the included angle between the first structural member and the second structural member, pivoting is stopped when the detected included angle fulfills a predetermined included angle such as 90 degrees, 45 degrees, and/or 0 degrees.

A step S404 comprises when the flexible display device fails to fulfill the intelligent protective condition, no action is performed.

The intelligent protecting method of the present invention, by detecting that the flexible display device is in the intelligent protective mode and fulfills the intelligent protective condition, controls the first structural member and the second structural member of the flexible display device to pivot at a predetermined angular velocity relative to the pivot shaft such that an included angle between the flexible display screen lamination structure of the first structural member and the flexible display screen lamination structure of the second structural member is less than 180 degrees. In other words, when the flexible display screen lamination structures of the flexible display device are between the first structural member and the second structural member, the flexible display device is prevented from being damaged by an external impact when falling off to the ground.

Some other embodiments of the intelligent protecting method provided by the present invention will be described subsequently as follows based on the above descriptions of the flexible display device and the intelligent protecting method in the flexible display device.

In some examples, the flexible display device further comprises an accelerometer, and the intelligent protecting method comprises steps as follows.

A step S501 comprises detecting whether the flexible display device is in the intelligent protective mode.

A step S502 comprises displaying an intelligent protective mode activation pop-up window on a displaying interface of the flexible display device when it is detected that the flexible display device in not in the intelligent protective mode.

In the embodiment, the intelligent protective mode activation pop-up window comprises an activation button and an deactivation button. By the activation button and the deactivation button, a user can switch on the intelligent protective mode or switch off the intelligent protective mode.

A step S503 comprises receiving a triggering operation to the activation button, and switching on the intelligent protective mode.

It should be understood that the user can manually make sure whether the intelligent protective mode is switched on. If the step S503 is: receiving a triggering operation to the deactivation button, and switching off the intelligent protective mode activation pop-up window. And at the meantime the intelligent protective mode of the flexible display device is still in a closed status.

It should be understood that the flexible display device is disposed with the intelligent protective mode, in the status of the intelligent protective mode switched on and the flexible display device fulfills a certain condition, the first structural member 101 and the second structural member 102 in the flexible display device can automatically pivot relative to the pivot shaft 103.

In the embodiment, the triggering operation can comprise a single click operation, a multi-click operation, and a long press operation. It should be understood that the multi-click operation comprises two click operations and more than two click operations, the long press operation can comprise a long press operation with a predetermined time such as a second or two seconds.

A S504 comprises acquiring gravity detection data detected by the gravity sensor, and acquiring acceleration detection data detected by the accelerometer.

A S505 comprises determining that the flexible display device fulfills the intelligent protective condition when it is determined that X-axis detection data in the gravity detection data fulfill predetermined X-axis intelligent protective data, Y-axis detection data in the gravity detection data fulfill predetermined Y-axis intelligent protective data, and Z-axis detection data in the gravity detection data fulfill predetermined Z-axis intelligent protective data, and when it is determined that the acceleration detection data fulfill a range of a predetermined acceleration detection data, it is.

It should be understood that in the gravity detection data of three directions detected by the gravity sensor, it is determined that the flexible display device fulfills the intelligent protective condition only when the X-axis detection data, the Y-axis detection data, and the Z-axis detection data fulfill the X-axis intelligent protective data, the Y-axis intelligent protective data, and the Z-axis intelligent protective data respectively, and the acceleration detection data fulfill the predetermined acceleration detection data.

It should be understood that the accelerometer can detect accelerations of the flexible display device on various directions, and can determine whether the flexible display device falls really or some operations of the user cause the flexible display device to have a certain acceleration.

When it is determined that the acceleration detection data fulfills the range of the predetermined acceleration detection data, for example, it is detected that the acceleration detection data is in a range from 9.75 to 10 m/s2, it can be determined that the flexible display device is falling, and therefore the step S506 can be performed subsequently.

A step S506 comprises controlling the first structural member and the second structural member of the flexible display device to pivot at a predetermined angular velocity relative to the pivot shaft such that an included angle between the flexible display screen lamination structure of the first structural member and the flexible display screen lamination structure of the second structural member is less than 180 degrees.

It should be understood that the predetermined angular velocity in the step S506 can be from 200 degrees per second to 257 degrees per second.

A step S507 comprises detecting an included angle between the first structural member and the second structural member, and stopping controlling the first structural member and the second structural member of the flexible display device to pivot relative to the pivot shaft at the predetermined angular velocity when the included angle fulfills a predetermined included angle.

It should be understood that the included angle between the flexible display screen lamination structure of the first structural member and the flexible display screen lamination structure of the second structural member fulfilling a specific angle can ensure that the flexible display device is prevented from being damaged by an external impact when falling off to the ground.

Therefore, when the step S506 controls the first structural member and the second structural member of the flexible display device to pivot at the predetermined angular velocity relative to the pivot shaft, the included angle between the first structural member and the second structural member can be detected. When the included angle fulfills the predetermined included angle, pivoting is stopped. It should be understood that the predetermined included angle can be 135 degrees, 90 degrees, 45 degrees, and 0 degrees.

The intelligent protecting method for a flexible display device of the present invention, by detecting that the flexible display device is in the intelligent protective mode and fulfills the intelligent protective condition, controls the first structural member and the second structural member of the flexible display device to pivot at a predetermined angular velocity relative to the pivot shaft such that an included angle between the flexible display screen lamination structure of the first structural member and the flexible display screen lamination structure of the second structural member is less than 180 degrees. In other words, when the flexible display screen lamination structures of the flexible display device are between the first structural member and the second structural member, the flexible display device is prevented from being damaged by an external impact when falling off to the ground.

The present invention also provides a flexible display device, and the flexible display device comprises a first structural member, a second structural member, processor, a storage device, a communication bus, and a pivot shaft connecting the first structural member with the second structural member.

Each of the first structural member and the second structural member on the flexible display device comprises a flexible display screen lamination structure 104.

Figure 5:
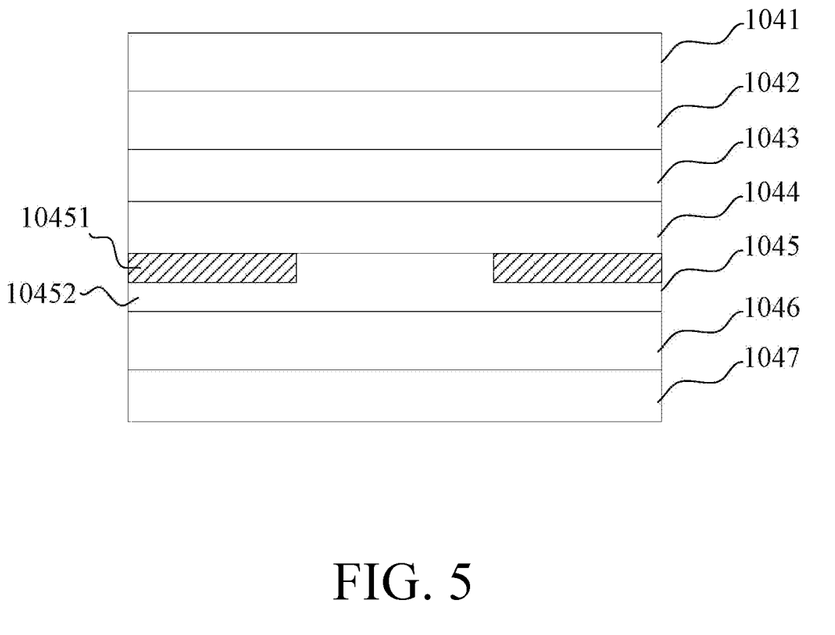
FIG. 5 is a schematic view of a flexible display screen lamination structure of a flexible display device provided by an embodiment of the present invention.
Figure 6:
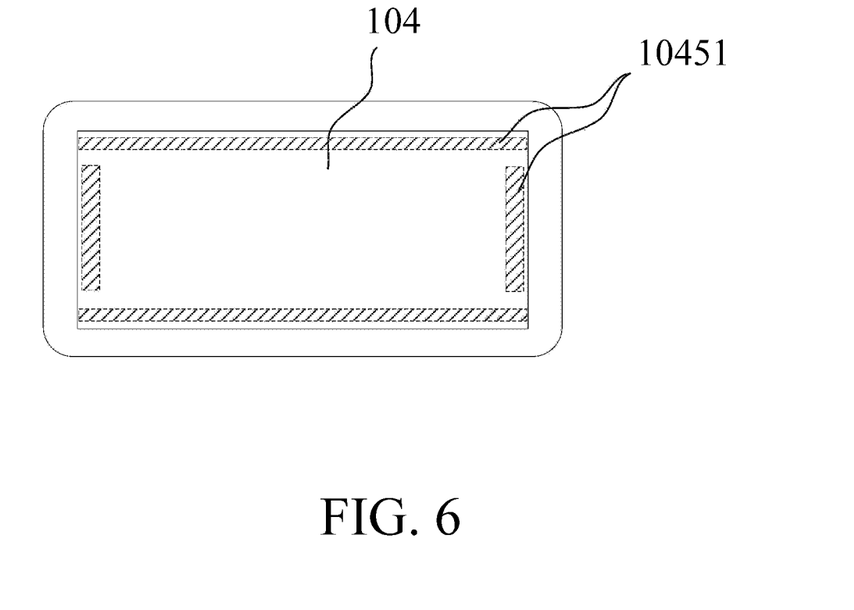
FIG. 6 is a schematic view of a flexible display screen lamination structure of a flexible display device provided by an embodiment of the present invention.

With reference to FIG. 5, the flexible display screen lamination structure 104 comprises a covering window layer (Cover window) 1041, a polarizer layer (POL) 1042, a touch panel layer (TP) 1043, a substrate layer (Panel) 1044, a sensitive and back-protective layer 1045, a buffer material layer 1046, and a back support (Mid frame) 1047. The sensitive and back-protective layer 1045 comprises a gravity sensor 10451 and a back protective material 10452. The gravity sensor is disposed on the back protective material. With reference to FIG. 6, in the embodiment, the gravity sensor 10451 is located in the flexible display screen lamination structure 104.

The communication bus is configured to achieve connective communication between the processor and the storage device.

The processor is configured to implement one or a plurality of programs stored in the storage device to perform the steps of the above intelligent protecting method for a flexible display device.

The present invention also provides a flexible display device, and the flexible display device comprises a first structural member, a second structural member, processor, a storage device, a communication bus, and a pivot shaft connecting the first structural member with the second structural member.

Figure 7:
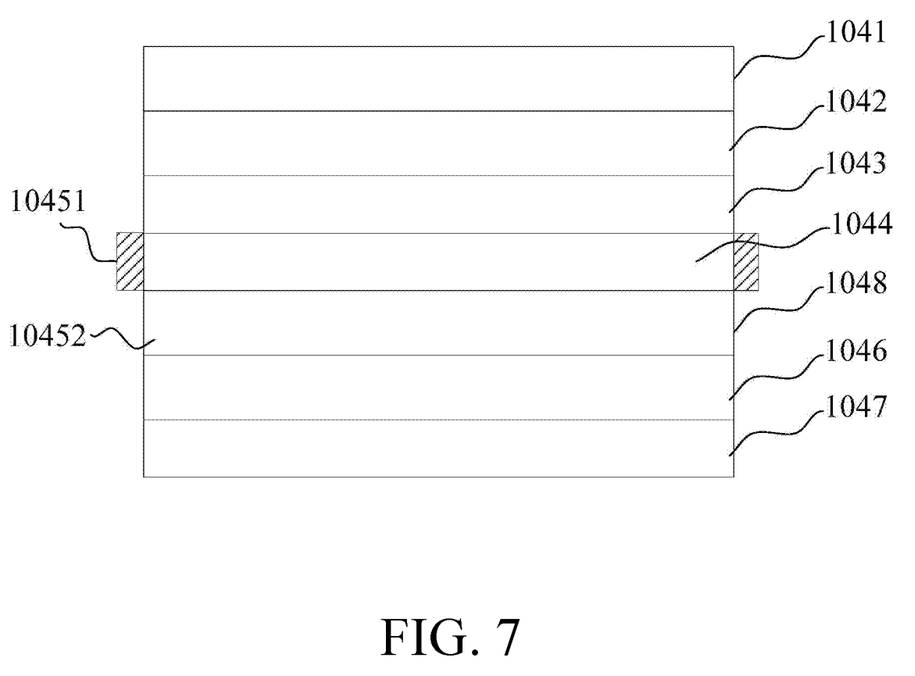
FIG. 7 is a schematic view of another flexible display screen lamination structure of a flexible display device provided by an embodiment of the present invention.
Figure 8:
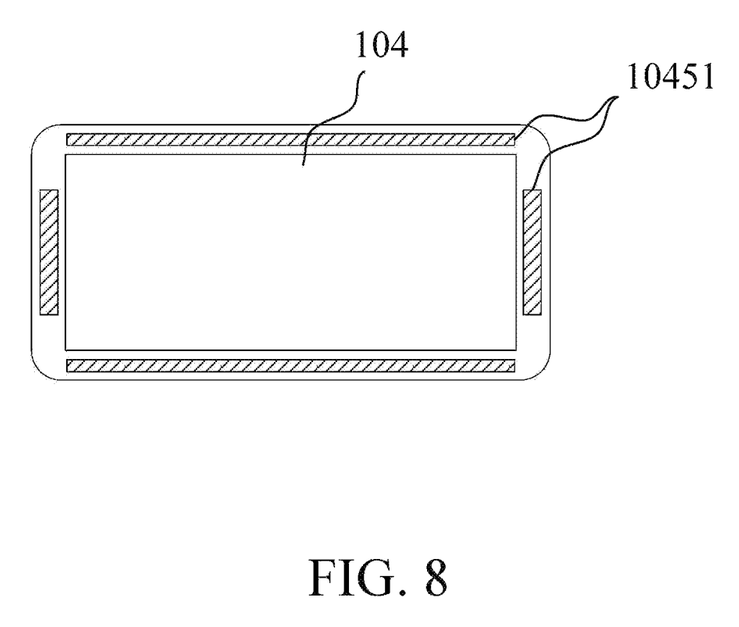
FIG. 8 is a schematic view of a flexible display screen lamination structure of a flexible display device provided by an embodiment of the present invention.

With reference to FIG. 7, each of the first structural member and the second structural member on the flexible display device comprises a flexible display screen lamination structure. The flexible display screen lamination structure comprises a covering window layer (Cover window) 1041, a polarizer layer (POL) 1042, a touch panel layer (TP) 1043, a substrate layer (Panel) 1044, a back protection layer 1048, a buffer material layer 1046, and a back support (Mid frame) 1047. With reference to FIG. 8, gravity sensors 10451 are disposed on edges of the substrate layer (Panel) 1044 respectively.

The communication bus is configured to achieve connective communication between the processor and the storage device.

The processor is configured to implement one or a plurality of programs stored in the storage device to perform the steps of the above intelligent protecting method for a flexible display device.

The present invention also provides a computer readable storage medium, the computer readable storage medium is stored with one or a plurality of programs, and the one or a plurality of programs can be one processor or a plurality of processors implemented to perform the steps of the above intelligent protecting method for a flexible display device.

It should be explained that for easily describing the above method embodiments, the method embodiments are described as a series of actions, however a person of ordinary skill in the art shall understand that the present invention is not limited by a sequence of the described actions, because according to the present invention, some steps can be performed under other sequence or at the same time. Second, a person of ordinary skill in the art shall also understand that, all the embodiments described in the specification belong to preferred embodiment, and related actions and modules are not necessary for the present invention.

In the above-mentioned embodiments, the descriptions of the various embodiments are focused. For the details of the embodiments not described, reference may be made to the related descriptions of the other embodiments. In the meantime, reference numerals of the above description are only for the purpose of description, and represent none of the advantages and disadvantages of the embodiments. Those of ordinary skill in the art, in the light of the present invention, without departing from the scope of the present invention and the scope of the claims, can also make many forms, which are within the protection of the present invention.

In the above-mentioned embodiments, the descriptions of the various embodiments are focused. For the details of the embodiments not described, reference may be made to the related descriptions of the other embodiments. In the meantime, reference numerals of the above description are only for the purpose of description, and represent none of the advantages and disadvantages of the embodiments. Those of ordinary skill in the art, in the light of the present invention, without departing from the scope of the present invention and the scope of the claims, can also make many forms, which are within the protection of the present invention.

What is claimed is:

1. A flexible display device, comprising a first structural member, a second structural member, a processor, a storage device, a communication bus, and a pivot shaft connecting the first structural member with the second structural member;
    wherein each of the first structural member and the second structural member on the flexible display device comprises a flexible display screen lamination structure, and the flexible display screen lamination structure comprises a covering window layer, a polarizer layer, a touch panel layer, a substrate layer, a sensitive and back-protective layer, a buffer material layer, and a back support;
    wherein the sensitive and back-protective layer comprises a gravity sensor and a back protective material, and the gravity sensor is disposed on the back protective material;
    wherein the communication bus is configured to achieve connective communication between the processor and the storage device;
    wherein the processor is configured to perform one or a plurality of programs stored in the storage device to implement:

detecting whether the flexible display device is in an intelligent protective mode;

if yes, acquiring gravity detection data detected by the gravity sensor, and determining whether the flexible display device fulfills an intelligent protective condition based on the gravity detection data;

when the flexible display device fulfills the intelligent protective condition, controlling the first structural member and the second structural member of the flexible display device to pivot at a predetermined angular velocity relative to the pivot shaft such that an included angle between the flexible display screen lamination structure of the first structural member and the flexible display screen lamination structure of the second structural member is less than 180 degrees.

2. The flexible display device as claimed in claim 1, wherein the processor is configured to determine that the flexible display device fulfills the intelligent protective condition when X-axis detection data in the gravity detection data fulfill predetermined X-axis intelligent protective data, Y-axis detection data in the gravity detection data fulfill predetermined Y-axis intelligent protective data, and Z-axis detection data in the gravity detection data fulfill predetermined Z-axis intelligent protective data.

3. The flexible display device as claimed in claim 2, wherein the flexible display device further comprises an accelerometer configured to acquire acceleration detection data, the processor is further configured to, before or after the gravity detection data is acquired, determine that the flexible display device fails to fulfill intelligent protective condition when the acceleration detection data fails to fulfill a range of a predetermined acceleration detection data.

4. The flexible display device as claimed in claim 1, wherein the processor is further configured to detect an included angle between the first structural member and the second structural member, and is further configured to stop controlling the first structural member and the second structural member of the flexible display device to pivot at the predetermined angular velocity relative to the pivot shaft when the included angle fulfills a predetermined included angle.

5. The flexible display device as claimed in claim 4, wherein the predetermined angular velocity ranges from 200 degrees per second to 257 degrees per second.

6. The flexible display device as claimed in claim 1, wherein the processor is further configured to display an intelligent protective mode activation pop-up window on a displaying interface of the flexible display device when it is detected that the flexible display device is not in the intelligent protective mode, and the intelligent protective mode activation pop-up window comprises an activation button and a deactivation button;

the touch panel layer is configured to receive a triggering operation to the activation button, and the processor is configured to switch on the intelligent protective mode accordingly; or the touch panel layer is configured to receive a triggering operation to the deactivation button, and the processor is configured to switch off the intelligent protective mode activation pop-up window accordingly.

7. The flexible display device as claimed in claim 6, wherein the triggering operation comprises a single click operation, a multi-click operation, or a long press operation.

8. A flexible display device, comprising a first structural member, a second structural member, a processor, a storage device, a communication bus, and a pivot shaft connecting the first structural member with the second structural member;

wherein each of the first structural member and the second structural member on the flexible display device comprises a flexible display screen lamination structure, and the flexible display screen lamination structure comprises a covering window layer, a polarizer layer, a touch panel layer, a substrate layer, a back-protective layer, a buffer material layer, and a back support;

wherein gravity sensors are disposed on edges of the substrate layer respectively;

wherein the communication bus is configured to achieve connective communication between the processor and the storage device;

wherein the processor is configured to perform one or a plurality of programs stored in the storage device to implement:

detecting whether the flexible display device is in an intelligent protective mode;

if yes, acquiring gravity detection data detected by the gravity sensor, and determining whether the flexible display device fulfills an intelligent protective condition based on the gravity detection data;

when the flexible display device fulfills the intelligent protective condition, controlling the first structural member and the second structural member of the flexible display device to pivot at a predetermined angular velocity relative to the pivot shaft such that an included angle between the flexible display screen lamination structure of the first structural member and the flexible display screen lamination structure of the second structural member is less than 180 degrees.

9. The flexible display device as claimed in claim 8, wherein the processor is configured to determine that the flexible display device fulfills the intelligent protective condition when X-axis detection data in the gravity detection data fulfill predetermined X-axis intelligent protective data, Y-axis detection data in the gravity detection data fulfill predetermined Y-axis intelligent protective data, and Z-axis detection data in the gravity detection data fulfill predetermined Z-axis intelligent protective data.

10. The flexible display device as claimed in claim 9, wherein the flexible display device further comprises an accelerometer configured to acquire acceleration detection data, the processor is further configured to, before or after the gravity detection data is acquired, determine that the flexible display device fails to fulfill intelligent protective condition when the acceleration detection data fails to fulfill a range of a predetermined acceleration detection data.

11. The flexible display device as claimed in claim 8, wherein the processor is further configured to detect an included angle between the first structural member and the second structural member, and is further configured to stop controlling the first structural member and the second structural member of the flexible display device to pivot at the predetermined angular velocity relative to the pivot shaft when the included angle fulfills a predetermined included angle.

12. The flexible display device as claimed in claim 11, wherein the predetermined angular velocity ranges from 200 degrees per second to 257 degrees per second.

13. The flexible display device as claimed in claim 8, wherein the processor is further configured to display an intelligent protective mode activation pop-up window on a displaying interface of the flexible display device when it is detected that the flexible display device is not in the intelligent protective mode, and the intelligent protective mode activation pop-up window comprises an activation button and a deactivation button;

the touch panel layer is configured to receive a triggering operation to the activation button, and the processor is configured to switch on the intelligent protective mode accordingly; or the touch panel layer is configured to receive a triggering operation to the deactivation button, and the processor is configured to switch off the intelligent protective mode activation pop-up window accordingly.

14. An intelligent protecting method for a flexible display device, wherein the flexible display device comprises a first structural member, a second structural member, and a pivot shaft connecting the first structural member with the second structural member, a surface of the first structural member, second structural member comprises a flexible display screen lamination structure, the flexible display device comprises a gravity sensor therein, and the intelligent protecting method comprises:

detecting whether the flexible display device is in an intelligent protective mode;

if yes, acquiring gravity detection data detected by the gravity sensor, and determining whether the flexible display device fulfills an intelligent protective condition based on the gravity detection data;

when the flexible display device fulfills the intelligent protective condition, controlling the first structural member and the second structural member of the flexible display device to pivot at a predetermined angular velocity relative to the pivot shaft such that an included angle between the flexible display screen lamination structure of the first structural member and the flexible display screen lamination structure of the second structural member is less than 180 degrees.

15. The intelligent protecting method as claimed in claim 14, wherein determining whether the flexible display device fulfills an intelligent protective condition based on the gravity detection data comprises:

determining that the flexible display device fulfills the intelligent protective condition when X-axis detection data in the gravity detection data fulfill predetermined X-axis intelligent protective data, Y-axis detection data in the gravity detection data fulfill predetermined Y-axis intelligent protective data, and Z-axis detection data in the gravity detection data fulfill predetermined Z-axis intelligent protective data.

16. The intelligent protecting method as claimed in claim 15, wherein the flexible display device further comprises an accelerometer, and before or after acquiring gravity detection data detected by the gravity sensor, the method further comprises:

acquiring acceleration detection data detected by the accelerometer; determining whether the flexible display device fulfills an intelligent protective condition the based on the gravity detection data further comprises:

determining that the flexible display device fails to fulfill the intelligent protective condition when it is determined that the acceleration detection data fails to fulfill a range of a predetermined acceleration detection data.

17. The intelligent protecting method as claimed in claim 14, wherein controlling the first structural member and the second structural member of the flexible display device to pivot relative to the pivot shaft at a predetermined angular velocity further comprises a later step:

detecting an included angle between the first structural member and the second structural member, and stopping controlling the first structural member and the second structural member of the flexible display device to pivot relative to the pivot shaft at the predetermined angular velocity when the included angle fulfills a predetermined included angle.

18. The intelligent protecting method as claimed in claim 14, wherein the predetermined angular velocity ranges from 200 degrees per second to 257 degrees per second.

19. The intelligent protecting method as claimed in claim 14, wherein the intelligent protecting method further comprises:

displaying an intelligent protective mode activation pop-up window on a displaying interface of the flexible display device when it is detected that the flexible display device is not in the intelligent protective mode, wherein the intelligent protective mode activation pop-up window comprises an activation button and a deactivation button;

receiving a triggering operation to the activation button, and switching on the intelligent protective mode;

or, receiving a triggering operation to the deactivation button, and switching off the intelligent protective mode activation pop-up window.

20. The intelligent protecting method as claimed in claim 19, wherein the triggering operation comprises a single click operation, a multi-click operation, or a long press operation.

* * * * *